Figure 1B:
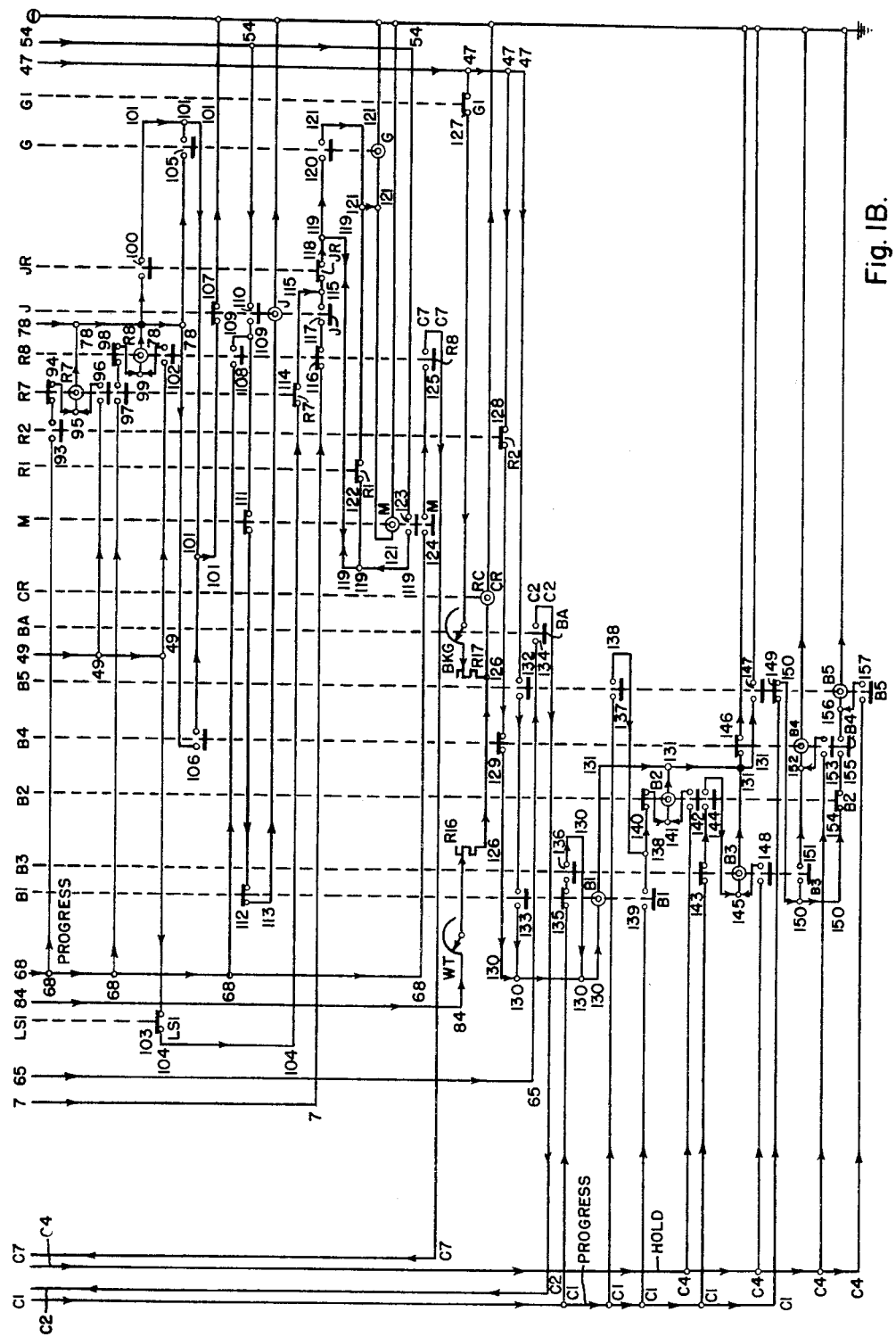

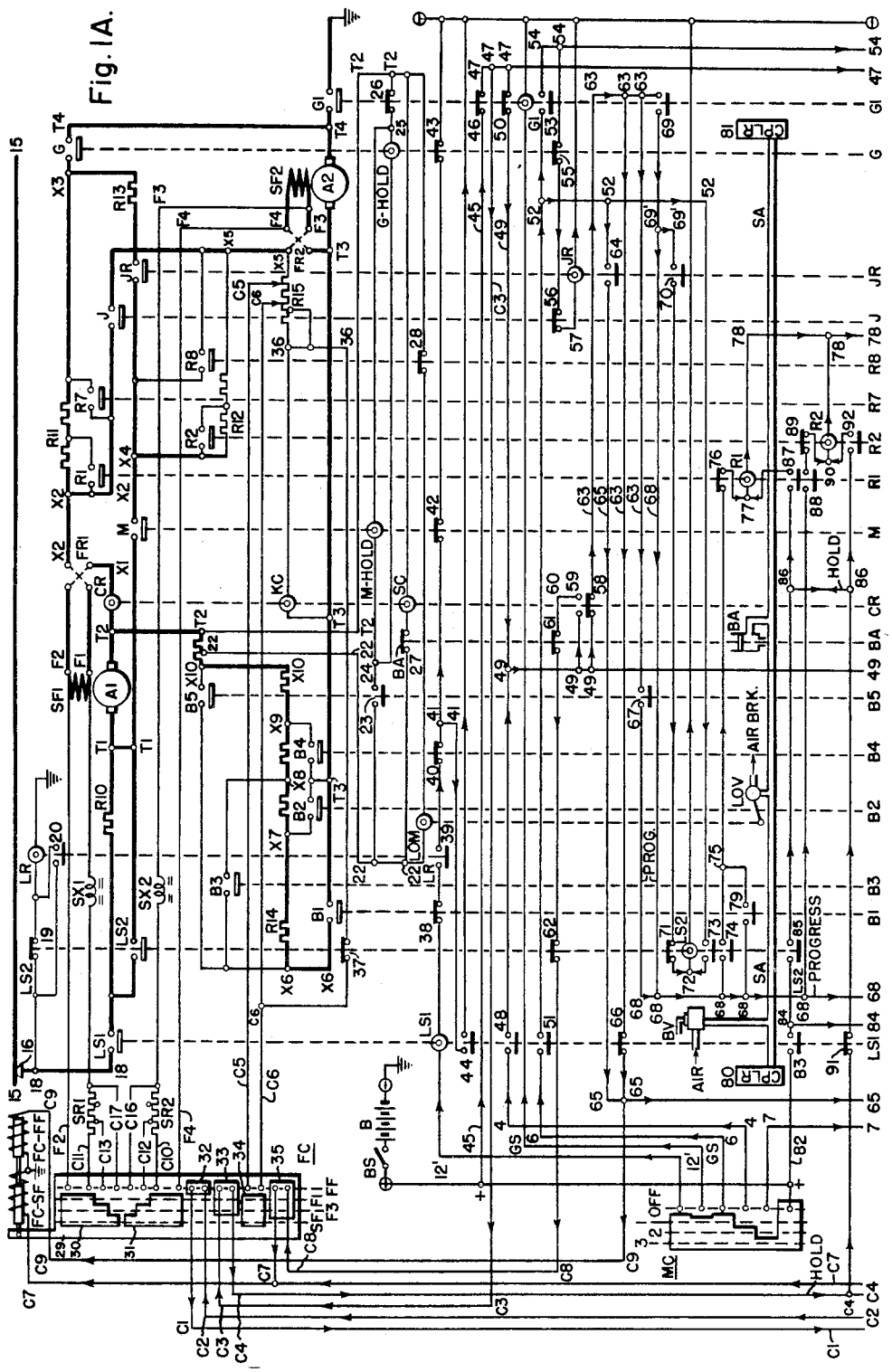

May 23, 1961 — G. R. PURIFOY ET AL — 2,985,810
TRACTION-MOTOR DYNAMIC-BRAKING CONTROL
Filed July 2, 1957 — 3 Sheets-Sheet 3

SEQUENCE CHART

| BV | MC | STEP | LS1 | G1 | LS2 | JR | J | MG | M,G HOLD | R1 | R2 | R7 | R8 | C10/C11 | C12/C13 | C16/C17 | B1 | B2 | B3 | B4 | B5 | BA | SC | LR | 12/6 | GS | 4 | 7 |
|---|---|---|---|---|---|---|---|---|---|---|---|---|---|---|---|---|---|---|---|---|---|---|---|---|---|---|---|---|
| ON | OFF | A | | | | | | | | | | | | | | | | | | | | | | | | | | |
|  |  | B | | | | | | | | | | | | | | | | | | | | | | | ○ | | | | |
| OFF | 1 (SERIES) | P1 | ○ | ○ | | ○ | | | | | | | | | | | | | | | | | | | ○ | | | | |
|  | 2 | P2 | ○ | ○ | ○ | ○ | | | | | | | | | | | | | | | | | | | ○ | ○ | ○ | | |
|  |  | P3 | ○ | ○ | ○ | ○ | | | | ○ | | | | | | | | | | | | | | | ○ | ○ | ○ | ○ | |
|  |  | P4 | ○ | ○ | ○ | ○ | | | | ○ | ○ | | | | | | | | | | | | | | ○ | ○ | ○ | ○ | |
|  |  | P5 | ○ | ○ | ○ | ○ | | | | ○ | ○ | ○ | | | | | | | | | | | | | ○ | ○ | ○ | ○ | |
|  |  | P6 | ○ | ○ | ○ | ○ | | | | ○ | ○ | ○ | ○ | | | | | | | | | | | | ○ | ○ | ○ | ○ | |
|  |  | P7 | ○ | ○ | ○ | ○ | ○ | | | | | | | | | | | | | | | | | | ○ | ○ | ○ | ○ | |
|  | 3 (POWER/PARALLEL) | TR | ○ | ○ | ○ | ○ | ○ | ○ | | | | | | | | | | | | | | | | | ○ | ○ | ○ | ○ | ○ |
|  |  | P8 | ○ | ○ | ○ | | ○ | ○ | | | | | | | | | | | | | | | | | ○ | ○ | ○ | ○ | ○ |
|  |  | P9 | ○ | ○ | ○ | | ○ | ○ | | ○ | | | | | | | | | | | | | | | ○ | ○ | ○ | ○ | ○ |
|  |  | P10 | ○ | ○ | ○ | | ○ | ○ | | ○ | ○ | | | | | | | | | | | | | | ○ | ○ | ○ | ○ | ○ |
|  |  | P11 | ○ | ○ | ○ | | ○ | ○ | | ○ | ○ | ○ | | | | | | | | | | | | | ○ | ○ | ○ | ○ | ○ |
|  |  | P12 | ○ | ○ | ○ | | ○ | ○ | | ○ | ○ | ○ | ○ | | | | | | | | | | | | ○ | ○ | ○ | ○ | ○ |
|  |  | P13 | ○ | ○ | ○ | | ○ | ○ | | ○ | ○ | ○ | ○ | ○ | | | | | | | | | | | ○ | ○ | ○ | ○ | ○ |
|  |  | P14 | ○ | ○ | ○ | | ○ | ○ | | ○ | ○ | ○ | ○ | ○ | ○ | | | | | | | | | | ○ | ○ | ○ | ○ | ○ |
|  |  | P15 | ○ | ○ | ○ | | ○ | ○ | | ○ | ○ | ○ | ○ | ○ | ○ | ○ | | | | | | | | | ○ | ○ | ○ | ○ | ○ |
|  | 2 | PA | ○ | ○ | ○ | | ○ | ○ | | ○ | ○ | ○ | ○ | ○ | ○ | | | | | | | | | | ○ | ○ | ○ | ○ | |
|  | 1 | PB | ○ | ○ | ○ | | ○ | ○ | | ○ | ○ | ○ | ○ | ○ | | | | | | | | | | | ○ | ○ | ○ | | |
|  | OFF | C' | ○ | | ○ | | ○ | ○ | | ○ | ○ | ○ | ○ | ○ | ○ | | | | | | | | | | ○ | ○ | | | |
|  |  | D' | ○ | | ○ | | | | | ○ | ○ | ○ | ○ | ○ | ○ | | | | | | | | | | ○ | ○ | | | |
|  |  | E' | ○ | | ○ | | | | | | | | ○ | ○ | ○ | | | | | | | | | | ○ | ○ | | | |
|  |  | F' | | | | | | | | | | | ○ | ○ | ○ | | | | | | | | | | ○ | | | | |
| ON (SPOT/BRAKING) |  | 1 | | | | | | ○ | | | | | | | ○ | ○ | ○ | ○ | | | | | | ○ | ○ | | | | |
|  |  | 2 | | | | | | ○ | | | | | | | ○ | ○ | | ○ | | | | | | ○ | ○ | | | | |
|  |  | 3 | | | | | | ○ | | | | | | | ○ | | | ○ | | | | | | ○ | ○ | | | | |
|  |  | 4 | | | | | | ○ | | | | | | | | | | ○ | | | | | ○ | | ○ | | | | |
|  |  | 5 | | | | | | ○ | | | | | | | | | | ○ | ○ | | | | ○ | | ○ | | | | |
|  |  | 6 | | | | | | ○ | | | | | | | | | | ○ | ○ | ○ | | | ○ | | ○ | | | | |
|  |  | 7 | | | | | | ○ | | | | | | | | | | | | | ○ | | ○ | | ○ | | | | |
|  |  | 8 | | | | | | ○ | ○ | | | | | | | | | | | | ○ | ○ | ○ | | ○ | | | | |
|  |  | 9 | | | | | | ○ | ○ | | | | | | | | | | | ○ | ○ | ○ | ○ | | ○ | | | | |
|  |  | 10 | | | | | | ○ | ○ | | | | | | | | | | ○ | ○ | ○ | ○ | ○ | | ○ | | | | |
|  |  | 11 | | | | | | ○ | ○ | | | | | | | | | ○ | ○ | ○ | ○ | ○ | ○ | | ○ | | | | |
|  |  | 12 | | | | | | ○ | ○ | ○ | | | | | | | | ○ | ○ | ○ | ○ | ○ | ○ | | ○ | | | | |
|  |  | 13 | | | | | | ○ | ○ | ○ | ○ | | | | | | | ○ | ○ | ○ | ○ | ○ | ○ | | ○ | | | | |
|  |  | 14 | | | | | | | ○ | ○ | ○ | ○ | | | | | | ○ | ○ | ○ | ○ | ○ | ○ | | ○ | | | | |
|  |  | 15 | | | | | | | ○ | ○ | ○ | ○ | ○ | | | | | ○ | ○ | ○ | ○ | ○ | ○ | | ○ | | | | |
| ON / OFF (BRAKE SPOT) | OFF | 13 | | | | | | ○ | ○ | ○ | ○ | | | | | | | ○ | ○ | ○ | ○ | ○ | ○ | | ○ | | | | |
|  |  | * | | | | | | ○ | ○ | ○ | ○ | | | | ○ | | | ○ | ○ | ○ | ○ | ○ | | ○ | ○ | | | | |
|  |  | *A | | | | | | ○ | ○ | ○ | ○ | | | | ○ | ○ | | ○ | ○ | ○ | ○ | ○ | | ○ | ○ | | | | |
|  |  | *B | | | | | | ○ | | | | | | | ○ | ○ | | ○ | | | | | | ○ | ○ | | | | |
| ON / OFF (BRAKE) | OFF | 14 | | | | | | | ○ | ○ | ○ | ○ | | | | | | ○ | ○ | ○ | ○ | ○ | ○ | | ○ | | | | |
|  |  | ✦ | | | | | | | ○ | ○ | ○ | ○ | | | ○ | | | ○ | ○ | ○ | ○ | ○ | | | ○ | | | | |
|  |  | ✦A | | | | | | | ○ | ○ | ○ | ○ | | | ○ | ○ | | ○ | ○ | ○ | ○ | ○ | | | ○ | | | | |
|  |  | ✦B | | | | | | | | | | ○ | | | | | | ○ | | | | | | | ○ | | | | |
|  | 1 | TR1 | | | | | | | | | | ○ | | | | | | ○ | | | | | | | ○ | ○ | | | |
|  |  | TR2 | | ○ | | | | | | | | ○ | | | | | | ○ | | | | | | | ○ | ○ | ○ | | |
|  |  | TR3 | | ○ | | | | | | | | | | | | | | | | | | | | | ○ | ○ | ○ | | |
|  |  | TR4 | ○ | ○ | | | | | | | | | | | | | | | | | | | | | ○ | ○ | ○ | | |
|  | PWR. | P1 | ○ | ○ | | ○ | | | | | | | | | | | | | | | | | | | ○ | ○ | ○ | | |

\* Discontinuance Of Braking In Step 13.
✦ Discontinuance Of Braking In Step 14.

Fig. 2.

United States Patent Office 2,985,810
Patented May 23, 1961

2,985,810
TRACTION-MOTOR DYNAMIC-BRAKING CONTROL

George R. Purifoy, Pittsburgh, and Norman H. Willby, Irwin, Pa., assignors to Westinghouse Electric Corporation, East Pittsburgh, Pa., a corporation of Pennsylvania Filed July 2, 1957, Ser. No. 669,550

4 Claims. (Cl. 318—262)

Our invention relates to a dynamic-braking control-assembly for two direct-current series motor-means for a common load-device such as an electrically propelled vehicle, and it has particular relation to an electrical control-system for an electrically propelled railway-car, which is adapted to be operable either singly or as a unit of a multiple-unit train, such as is used in a rapid-transit system.

Considerable trouble and field-expense are being encountered on previously operating equipments, as a result of the burning of the arc-chutes of switches which are opened upon the release of a "service" dynamic-braking operation. Tests and studies show that this burning is due to high motor-voltage and currents, when the car is operating at high speeds. Our invention relates to a rearrangement of the control-assembly which overcomes this burning by interlocking the hold-circuits of the switches in the dynamic-braking circuits, so that these hold-circuits are not released until after the field-controller has reached a shunted-field position, in which the motor voltages and currents are reduced.

A more detailed explanation of the specific features of our invention will be given in the following description, and will be defined in the appended claims, in connection with an illustration of an exemplary form of embodiment of the invention in the accompanying drawing, wherein:

Figs. 1A and 1B, taken together, constitute a much simplified wiring-diagram of the circuits and apparatus which are necessary for an understanding of the novel features of the invention, in a preferred form of embodiment; and Fig. 2 is a sequence chart of the operation.

Figs. 1A and 1B represent some of the equipment which is carried by a single electrically propelled railway-car embodying our invention. Direct-current power is supplied to the car from a third rail 15, or a trolley wire, which is engaged by a third-rail shoe 16, or by a trolley pole, pantograph or other current-collecting equipment carried by the car. The third-rail shoe 16 is connected to a conductor 18 which constitutes a supply-circuit for the car.

The traction-motors for the car are direct-current series motors, which are shown in Fig. 1A, by way of a simple example, as comprising two motor-armatures A1 and A2, each being associated with its own series field winding SF1 and SF2, respectively. Each of the two series motors may be regarded as representing a motor-means or circuit, each of which may comprise two or more motors which are, at times, switched as a single motor-means or circuit. For example, in most multiple-unit rapid-transit trains, each car or unit is driven by four motors, connected in two motor-circuits, each motor-circuit comprising two motors which are permanently connected in series with each other.

In Fig. 1A, the first series-motor means or circuit comprises, in series, an armature-terminal T1, a motor-armature or armatures A1, an armature-terminal T2, a series relay-coil CR of a limit-relay which is also designated CR, an intermediate circuit or conductor X1, a field-reverser FR1, a field-terminal F2, a series main-field winding or windings SF1 for supplying the field-excitation for said armature or armatures A1, a field-terminal F1, the field-reverser FR1 again, and an intermediate circuit or terminal X2. The corresponding parts for the second series-motor means or circuit are indicated at T4, A2, T3, FR2, F4, SF2, F3, FR2 again, and X5, noting that the series relay-coil CR is not present in this second series-motor means or circuit.

A series-parallel motor-control arrangement is shown in Fig. 1A, in which a line-switch LS1 and a ground-switch G1 are used as power-switching means for establishing a power-circuit for energizing the motors, by connecting the armature-terminal T1 to the supply-circuit 18, and connecting the armature-terminal T4 to ground. For completing the series-circuit connections, a series-motor switch JR is closed, in addition to the power-switches LS1 and G1. For parallel-motor operation, two parallel-motor switches M and G are closed, in addition to the power-switches LS1 and G1. The parallel-motor switch M provides a circuit connection between the armature-terminal T1 of one series-motor means, and the intermediate connection or terminal X5 of the other series-motor means; while the other parallel-motor switch G provides a circuit-connection between the armature-terminal T4 and the intermediate connection or terminal X2. During an intermediate transition-period, a transition-switch J is closed. These motor-controlling connections are all in accordance with a well-known switching-system.

A suitable number of series-connected accelerating resistances are used, as indicated at R10, R11, R12 and R13. The resistance R10 is disposed between the supply-line 18 and the first armature-terminal T1, and this resistance R10 is shorted out by means of a second line-switch LS2. The resistance R11 is in series between the intermediate connection or terminal X2 and an intermediate connection-point X3, which is connected to the terminal T4 through the parallel-connection switch G; and said resistance R11 is progressively reduced or shorted out by means of any desired number of switch-contacts of which only R1 and R7 are shown. The resistance R12 is in series between the intermediate terminal X5 and an intermediate connection-point X4, which is in turn connected to the terminal T1 by the parallel-connection switch M; and said resistance R12 is progressively reduced or shorted out by any desired number of switch-contacts, of which only R2 and R8 are shown. The resistance R13 is in the series-motor connection, which is made between the points X3 and X4 by the switch JR, and this resistance R13 is finally shorted out by the transition-switch J, which makes a connection between the intermediate connection-points X2 and X5, for obtaining the full-series power-circuit connection of the motors.

Dynamic-braking circuits are established by opening the two power-switches LS1 and G1, and closing a braking-switch B1 in addition to the two parallel-connection switches M and G, also in accordance with a well-known system or arrangement. The braking-switch B1 provides a common dynamic-braking circuit-connection X6, X7, X8, X9 and X10 between the armature-terminals T3 and T2 of the two series-motor means, thus providing two dynamic-braking circuits wherein the motor-armature or armatures of each of said series-motor means are loaded by the field winding or windings of the other one of said series-motor means, in series with one of the accelerating resistances R11 and R12.

During both series and parallel motor operation, and also during dynamic braking, the switch-contacts R1, R2, R7 and R8 are successively or progressively closed in any manner which is suitable for progressively reducing the resistances. During parallel motor operation, after all of the accelerating resistances R11 and R13 have been cut out, the field-strengths of the motors are progressively reduced, to provide shunted-field operating-conditions.

In accordance with a usual arrangement, the motor-fields are reduced by equipping each of the series field windings SF1 and SF2 with a field-shunt, comprising an inductive reactor SX1 and SX2, respectively, and a variable resistor SR1 and SR2, respectively. The field-shunts SX1–SR1 and SX2–SR2 are first connected in parallel relation to their respective field-windings SF1 and SF2, by means of contact-terminals C11 and C10, respectively, of any suitable progressively or sequentially operating field-controlling means, which is herein illustrated as an electrically operated drum-type field-controller FC. After the respective field-shunts have been connected into operation, the field-shunt resistances SR1 and SR2 are then progressively shorted out by successive controller-points, of which only C13 and C17 are shown for SR1, and only C12 and C16 are shown for SR2, as the field-controller FC is moved from its initial full-field position FF, through its intermediate positions, of which only F1 and F3 are shown, to its shunted-field position SF, at which point the field-winding currents are reduced to about 40% of their unshunted values.

During dynamic braking, the braking-switch B1 connects the two motors through the common dynamic-braking circuit-connection X6 to X10, which contains a five-part braking-resistance R14 which is not a part of the motor-accelerating circuit. This braking-resistance R14 is used, in addition to the previously mentioned accelerating-resistances R11 and R12, in establishing the complete dynamic-braking circuits. The braking-resistance R14 is progressively reduced in value, by means of a suitable operation of braking-switches B2 to B5, in addition to the main braking-switch B1, during the dynamic-braking operation, and after the braking-resistance R14 has been reduced in value as much as it is going to be reduced, by the braking-switches B1 to B5, the acceleration-resistances R11 and R12, or portions thereof, are progressively shorted out, or reduced in value, by the acceleration-switches R1, R2, R7 and R8.

The progressive operation of the various resistance-shorting switches, during both motoring operation and dynamic braking, is under the automatic control of a suitable limit-relay CR, which is energized to be controllably responsive to conditions which accompany current-increments in the motor. Such a limit-relay is illustrated, in Figs. 1A and 1B, in the form of a single current-relay CR which is provided, in the illustrated form of embodiment of our present invention, with at least four operating-coils, namely the previously mentioned series coil CR, a kick-coil KC, a spot-coil SC, and a rate-coil RC, all acting cumulatively to cause a relay-response, as shown and described in a Purifoy application, Ser. No. 669,611, filed July 2, 1957, entitled Traction-Motor Acceleration and Dynamic-Braking Control, over which the present invention is an improvement.

The series coil CR is a one-turn current-coil which is serially connected between the points T2 and X1 in the motor-accelerating part of one of the motor-circuits, as is well known. The kick-coil KC is a multiturn shunt relay-coil which is connected across the terminals T3 and X5 of the series main-field winding SF2 of the other motor-circuit, with a variable resistor R15 connected in series with the kick-coil KC for recalibrating purposes, as will be subsequently described. The spot-coil SC is a multiturn braking-current coil which is energized across a portion 22–T2 of the braking-resistance R14, as will be subsequently described. The rate-coil RC is a multiturn battery-energized coil which is controlled for recalibration purposes during motoring and braking, as will be subsequently described.

As shown in Fig. 1A, this limit-relay CR has a back-contact 58, which is normally closed, in the non-actuated or low-current position of the relay, and it also has a make-contact 59, which is closed when the relay-excitation is considerably higher than that which is necessary to break the back-contact 58.

All of the electrically controlled relays and switches which are shown in the drawing are diagrammatically indicated as having vertical switch-stems (indicated by dotted lines), which are biased by gravity toward their lowermost positions, and all of these relays and switches are shown in their deenergized or non-actuated positions. All of the relays and switches are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle. In general, the same switch-designation is applied to any particular switch, its coil, and its contacts, by way of identification of the parts belonging to a given switch or relay.

Energy for the various relay-circuits or control-circuits is provided by means of a battery B on each car, as shown near the left center in Fig. 1A. The negative terminal (−) of the battery is permanently grounded, to constitute the negative bus (−) of the relay-circuits; while the positive terminal of the battery is connected, through a battery-switch BS, to the positive bus (+) of the relay-circuits.

At the top of the main motor-circuits in Fig. 1A, we show the supply-circuit 18 as being used to energize a line-relay LR through a back-contact 19 of the second line-switch LS2. This line relay LR picks up when an adequate line-voltage appears on the supply-conductor 18. This line-relay has a make-contact 20 which by-passes the LS2 back-contact 19 when the line-relay is energized.

The braking-current-responsive circuit 22–T2, which is shown immediately below the main motor-circuits in Fig. 1A, is energized from a tap-point 22 in the last section of the braking-resistance R14, so that this circuit 22–T2 is not energized except when a braking circuit is established.

Thus, as described and claimed in the aforesaid Purifoy application Ser. No. 669,611, we provide a braking-current-responsive circuit extending from the conductor 22 through a make-contact 23 of the braking-circuit contactor B5, and thence through a circuit 24 to a hold-coil M-Hold of the parallel-connection switch M, then to a circuit 25, and finally through a back contact 26 of the ground-switch G1, to the conductor T2. Connected between the circuit-points 24 and 25, there is also a hold-coil G-Hold of the parallel-connection switch G. These two hold-coils M-Hold and G-Hold are intended to be symbolic of any means which will hold their respective switches or contactors closed after they are once closed by other means (to be subsequently described), but which will not close or energize these switches from a deenergized position.

Also in accordance with the invention of the aforesaid Purifoy application Ser. No. 669,611, we provide another braking-current-responsive circuit extending from the conductor 22, through a back-contact 27 of a brake-actuator BA which will be subsequently described, and thence through the spot-coil SC of the limit-relay CR, to the circuit T2. This is for the purpose of energizing the spot-coil SC only during the "spotting" operation.

A final braking-current-responsive circuit is also shown, extending from the conductor 22, through the magnet-coil LOM of a subsequently described lock-out magnet, and thence through a back-contact 28 of the resistance-shorting switch R8, to the circuit T2.

The exemplary field-controller FC, which is illustrated in the top left portion of Fig. 1A, consists of a drum 29, carrying six contact-segments 30 to 35. The segment 30 engages the field-terminal F2 and the oddnumbered controller-contacts C11 to C17 in the previously described field-shunting progression, while the segment 31 engages the field-terminal F4 and the even-numbered controller contacts C10 to C16, in the previously described field-shunting progression. The segment 32 engages two controller-circuits C1 and C2 in the full-field position FF of the field-controller FC. The segment 33 engages two controller-circuits C3 and C4 in the controller-positions FF through F3. The segment 34 engages two controller-circuits C5 and C6 in the controller-positions F1 through SF; and these controller-circuits C5 and C6 are connected to adjustable intermediate tap-points C5 and C6 on the kick-coil resistor R15. The segment 35 engages two controller-circuits C7 and C8 in the controller-positions FF through F3, maintaining this connection to a point a little further beyond the position F3 than the segment 33.

The drum 29 of the field-controller FC is operable to its full-field position FF by any suitable means, which is simply illustrated in the form of a solenoid or magnet-coil FC–FF, which is energized between ground and a controller-circuit C9. The drum 29 is operable to its shunt-field position SF by any suitable means which is illustrated as a solenoid or magnet-coil FC–SF, which is energized between ground and the controller-circuit C7. The drum 29 remains in its set position, if neither of its coils FC–FF or FC–SF is energized, or if both of said coils should be energized simultaneously.

The kick-coil resistance R15 is provided with a terminal 36 at the end of the resistance which is closest to the tap-point C6, and this terminal 36 is shown as being connected, through a back-contact 37 of the second line-switch LS2, to the aforesaid tap-point C6.

Each end of the illustrated car is provided with a motorman's master controller MC, only one of which is indicated in the drawing, since the master controller at the other end of the car is a duplicate of the illustrated controller. The master controller MC is illustrated in a simplified form, as having an off-position and three on-positions 1, 2 and 3. In each of the three on-positions of the master-controller MC, the positive control-wire (+) is connected to three trainline wires 12', GS and 6. In the second and third on-positions of the accelerating-drum of the master controller MC, a trainline wire 4 is energized from the positive bus (+); while in the third on-position of this controller, a trainline wire 7 is energized from the positive bus (+). During the off-movement of the master controller, in passing from the No. 1 on-position to the off-position, the trainline wire GS is deenergized prior to the deenergization of the trainline wires 12' and 6.

The first on-position of the master controller MC, in Fig. 1A, is a train-switching position, in which the car or train is slowly moved, at its minimum speed, for moving the car or train for short distances. In this No. 1 controller-position, the control-wires 12', GS and 6 are energized.

As shown near the center of Fig. 1A, the wire 12' energizes an exciting-circuit which first extends through the operating coil LS1 of the line-switch LS1, then extends through a back-contact 38 of the brake-switch B1, a make-contact 39 of the line-relay LR, a back-contact 40 of the brake-switch B4, a circuit 41, a back-contact 42 of the parallel-connection switch M, and a back-contact 43 of the parallel-connection switch G, to the negative bus (−). A hold-circuit is also provided, between the circuit 41 and the negative bus (−), through a make-contact 44 of the line-switch LS1.

The next circuit which is shown in Fig. 1A is a circuit-connection 45 from the positive bus (+) through a back-contact 46 of the ground-switch G1, to a power-off switching-circuit 47, in accordance with the aforesaid Purifoy application Ser. No. 669,611.

In accordance with our present invention, a backwardly extending circuit is next provided, from the power-off relaying-circuit 47 to the controller-terminal C3 of the field-controller, for the purpose of causing the contact-segment 33 of the field-controller FC to be in series with a hold-line C4, in the field-controller positions FF through F3.

In the order in which the circuits are shown in Fig. 1A, the next circuit is a connection from the wire 4, through a make-contact 48 of the line-switch LS1, to a control-circuit 49 which will be subsequently referred to. It will be recalled that the wire 4 was first energized in the No. 2 on-position of the master controller MC. This is the master-controller position in which it is desired to initiate the progessive operation of the resistance-reducing switches in the series motor-connection of the traction motors A1 and A2, in order to smoothly accelerate the car or train.

It will be noted, from Fig. 1A, that we have provided a second energizing-circuit, for the control-circuit 49, which extends back from the power-off switching-circuit 47, and which includes a back-contact 50 of the ground-switch G1. This energizing-branch of the control-circuit 49 is used during the dynamic-braking operation, as will be subsequently explained.

The next circuit shown in Fig. 1A is an energizing-circuit from the wire GS to the operating coil G1 of the ground-switch G1, and thence to the negative bus (−).

Next comes a circuit from the wire 6, through a make-contact 51 of the line-switch LS1, to a conductor 52, and thence on, through a make-contact 53 of the ground-switch G1, to a power-on switching-circuit 54. From this power-on switching-circuit 54, a connection extends back, or to the left, through a back-contact 55 of the parallel-connection switch G, and a back-contact 56 of the transition-switch J, to a conductor 57, which energizes the operating-coil JR of the series-motor switch JR.

Referring back again to the control-circuit 49, it will be noted that this circuit extends down to a point where it is connected to the two contacts 58 and 59 of the limit-relay CR. The contact 59 is a limit-relay make-contact, which completes a circuit from the conductor 49 to a conductor 60. The circuit from this conductor 60 extends through a back-contact 61 of the brake-actuator BA, and a back-contact 62 of the second line-switch LS2, to the controller-circuit C8, which is connected, by the field-controller segment 35, to the controller circuit C7, in all positions of the field-controller FC except the full-shunted-field position SF. It will be recalled that the controller circuit C7 energizes the field-controller magnet-coil FC–SF, which moves the field-controller drum 29 toward the shunted-field position SF.

The limit-relay contact 58 is a back-contact, which completes a circuit from the conductor 49 to a conductor 63, which will be referred to again, in a moment.

Referring now to the conductor 52 in Fig. 1A, it will be noted that this conductor has a branch extending downwardly to a backwardly or left-extending circuit, through a make-contact 64 of the series-motoring switch JR, to a circuit 65, which extends on, still further backwardly, or to the left, to connect with the controller wire C9 which energizes the full-field magnet-coil FC–FF for moving the field-controller drum 29 to its full-field position FF.

Next, in Fig. 1A, the conductor 63 is shown as having a backwardly or leftwardly extending connection 63, which passes through a back-contact 66 of the line-switch LS1, to the aforesaid circuit 65 which is connected to the full-field controller-conductor C9. This circuit 65 also has a downwardly extending branch 65, for purposes which will be explained in connection with Fig. 1B.

Next, in Fig. 1A, another leftwardly extending branch of the circuit 63 is shown as passing through a make-contact 67 of the brake-switch B5 to a progress-wire 68, which is used, during dynamic braking, in the progressive control of the resistance-shorting switches R1 to R8.

Fig. 1A next shows a second energizing-circuit for the progress-wire 68. This second circuit extends back (or leftwardly) from the conductor 63 to a make-contact 69 of the ground-switch G1, and thence to a conductor 69', which extends on leftward until it connects to the progress-wire 68. This progress-wire 68 is used, during the acceleration of the traction motors, in the progressive control of the second line-switch LS2, the resistance-shorting switches R1 to R8, and the transition-switch J.

The conductor 69', in Fig. 1A, has a downwardly extending connection, which extends to the left, through a make-contact 70 of the series-motoring switch JR, and then through a back-contact 71 of the second line-switch LS2, to an energizing-circuit 72 which energizes the operating-coil LS2 of said second line-switch LS2. A hold-circuit is also provided, for energizing the conductor 72 of the line-switch LS2, through an LS2 make-contact 73, which receives its energization from the previously mentioned conductor 52.

Next in Fig. 1A, there is shown a circuit extending from the progress-wire 68 through a make-contact 74 of the LS2 switch, to a conductor 75, and thence through a back-contact 76 of the first resistance-switch R1 to a conductor 77, and thence through the operating-coil R1 of this switch to a conductor 78, which will be subsequently referred to. The LS2 contact 74, at the beginning of this circuit, closes, with the closing of the second line-switch LS2, at the beginning of the motor-accelerating progression. This contact 74 is bypassed by a make-contact 79 of the braking-switch B1, so as to reenergize the progression-circuit 75 to the first resistance-switch R1, at the proper time during the dynamic-braking progression, as will be subsequently pointed out.

As shown near the bottom of Fig. 1A, the car is provided with two couplers 80 and 81, one coupler at each end, these couplers being used for making drawbar connections with other cars, and for making, inter alia, various air-connections, such as connections for a so-called "straight-air" pipe SA which is provided on each car which is to be usable as a unit of a multiple-unit train. A brake-valve BV is provided, for supplying compressed air at a controllably varied pressure to the "straight-air" pipeline SA when a "service" braking-operation is required, that is, when a substantial braking-force is to be applied to the car or train, as distinguished from the very small, usually negligible, braking-forces which are normally produced by the dynamic-braking circuits during the so-called "spotting" operation of the dynamic-braking equipment, which will be subsequently described.

The pressure of the air in the straight-air pipe SA is responded to by a brake-actuator cylinder BA, which is connected to said straight-air pipe, and which is provided with a piston which lifts a vertically illustrated dotted-line actuator-stem, also designated BA. Heretofore, this brake-actuator BA has been used to adjust the position of a brake-actuator rheostat, which is shown at BKG in the middle of Fig. 1B, so as to adjust the position of this rheostat in accordance with the severity of the braking operation which is called for by the position of the brake-valve BV, as will be subsequently described. In accordance with the invention which is covered in the aforesaid Purifoy application, we provide the brake-actuator BA with three electrical contacts 27 (Fig. 1A), 61 (Fig. 1A), and 134 (Fig. 1B), all of which are actuated as soon as the brake-actuator begins to move, in response to any on-position of the brake-valve BV.

As has been common in previous dynamic-braking railway-cars, the straight-air pipe SA is connected to air-brake equipment of each car by means of a lock-out valve LOV, which is electrically closed, upon the energization of the lock-out magnet LOM, and which is released when the lock-out magnet LOM becomes substantially deenergized. In this way, when the so-called fade-out point has been reached, and the braking-force of the dynamic-braking circuits becomes very small, the airbrake equipment is brought into operation, to finish bringing the train to a complete standstill.

Next, in Fig. 1A, there is shown a circuit 82 from the positive bus (+) through a make-contact 83 of the line-switch LS1 to a conductor 84, then through a make-contact 85 of the line-switch LS2 to a hold-wire 86, and finally through a make-contact 87 of the first resistance-switch R1 to the energizing-circuit 77 of this switch.

As next shown in Fig. 1A, the progression continues, from the progress-wire 68, through a make-contact 88 of the resistance-switch R1 and a back-contact 89 of the resistance-switch R2, to a conductor 90, and thence through the operating-coil of the resistance-switch R2 to the previously mentioned conductor 78.

At the bottom of Fig. 1A, we show a circuit from the hold-wire C4 through a back-contact 91 of the line-switch LS1 to the previously mentioned hold-circuit 86, and then through a make-contact 92 of the resistance-switch R2 to the energizing-circuit 90 of this switch.

As shown at the top of Fig. 1B, a progress-connection is next made from the progress-line 68, through an R2 make-contact 93, an R7 back-contact 94, a circuit 95, and the R7 energizing-coil, to the circuit 78. A hold-circuit is provided from the control-circuit 49 through an R7 make-contact 96 to the energizing-circuit 95 of this R7 switch.

A progress-circuit is next shown, in Fig. 1B, from the progress-wire 68, through an R7 make-contact 97, an R8 back-contact 98, a circuit 99, and the R8 energizing-coil, to the circuit 78, and then through a make-contact 100 of the series-motoring switch JR to a conductor 101, which will be subsequently referred to. A hold-circuit is provided from the control-circuit 49 through an R8 make-contact 102 to the circuit 99.

As described in the aforesaid Purifoy application, a circuit also extends to the left, from the bottom of the control-circuit 49 in Fig. 1B, to an LS1 back-contact 103, and thence to a conductor 104 which will be further mentioned later on.

At the end of the conductor 78 in Fig. 1B there are two circuit-connections, namely a rightwardly extending connection, which leads through a make-contact 105 of the parallel-connection switch G to the previously mentioned circuit 101, and a leftwardly extending connection, which leads through a make-contact 106 of the brake-switch B4 to the same previously mentioned circuit 101. This circuit 101 then continues to the negative bus (—), through a back-contact 107 of the transition-switch J.

From the progress-line 68 in Fig. 1B, a circuit next extends through an R8 make-contact 108 to a conductor 109. A second energizing-circuit for this conductor 109 is also provided, extending to the left from the power-on switching-circuit 54, through a make-contact 110 of the transition-switch J, to said conductor 109. A circuit from said conductor 109 then extends on, to the left, through a back-contact 111 of the parallel-connection switch M, and through a back-contact 112 of the braking-switch B1, to a conductor 113 which energizes the operating-coil J of the transition-switch J.

A branch-circuit is next shown, in Fig. 1B, extending from the conductor 104, and passing through an R7 back-contact 114 to a circuit 115, this branch-circuit being effective during the dynamic-braking operations.

A circuit is next shown, in Fig. 1B, extending from the wire 7, which is energized, in the third on-position of the master controller MC in Fig. 1A, for the purpose of initiating the parallel motor-connection in the accelerating control or power-operation of the traction motors A1 and A2 of Fig. 1A. This branch-circuit extends from the wire 7 through a back-contact 116 of the last accelerating-resistance switch R8, and a make-contact 117 of the transition-switch J, to the previously mentioned conductor 115.

The circuit 115 extends on, through a JR back-contact 118 to a conductor 119, and thence through a make-contact 120 of the parallel-connection switch G to a circuit 121. Another connection is made from the conductor 119, through a back-contact 122 of the resistance-switch R1, to said conductor 121. This conductor 121 constitutes an energizing-circuit for energizing both the G-coil and the M-coil of the two parallel-operation switches G and M. A hold-circuit is also provided, extending to the left from the bottom of the power-on switching-circuit 54, and thence through a make-contact 123 of the M-switch, to the previously mentioned conductor 119.

It will be observed that, before the parallel-connection switches M and G were closed, during the power-operation of the motors, the transition-switch J had to be closed, as will be seen from its interlock 117; and it will be further observed that, when this transition-switch J closed, it opened up the series-motoring switch JR, at the J-interlock 56 in Fig. 1A, and it opened up all of the resistance-switches R1 to R8, at the J-interlock 107 in Fig. 1B. The progressive operation of the resistance-switches R1 to R8 then commenced all over again, from the progress-wire 68 in Fig. 1A, the negative circuits of the coils R1 to R8 being completed through the G-interlock 105, in Fig. 1B.

It will be observed, however, that when the parallel-connection switches M and G are closed during the braking-operation of the motors (through the R7 interlock 114 in Fig. 1B), the above-described progression of the resistance-switches R1 to R8 will not commence immediately, because the first progression will be established through the control of the brake-switches B1 to B5, as will be subsequently described.

The next control-circuit in Fig. 1B extends from the bottom of the progress-line 68, and continues through a make-contact 124 of the parallel-connection switch M and a make-contact 125 of the last resistance-switch R8, to the field-controller circuit C7 which energizes the shunt-field coil FC-SF of the field-controller FC in Fig. 1A. During the motoring operation, this energization of the shunt-field coil FC-SF occurs at the end of the full-field parallel-connection acceleration, and it initiates the progression of the field-controller FC from its full-field position FF to its shunt-field position SF. However, during the dynamic-braking operation, this energization of the shunt-field controller-coil FC-SF occurs at fade-out, and it produces no controller-movement, because the full-field controller-coil FC-FF is being simultaneously energized, through the C9 circuit which extends from the conductor 65 in Fig. 1A.

In Fig. 1B, a branch-circuit 84 extends down, from the conductor 84 in Fig. 1A, and is used to energize an energizing-circuit 126 of the rate-coil RC of the limit-relay CR, through a weight-controlled rheostat WT, and an adjustable resistance R16. This rate-coil energizing-circuit, which includes the weight-responsive rheostat WT, is energized when the circuit 84 is energized, and it will be seen, from Fig. 1A, that this circuit 84 is energized from the positive wire 82 as soon as the power-operation of the motors is initiated, as supervised by the LS1 interlock 83. The weight-responsive rheostat WT is a known device, which is automatically adjusted according to the variable weight or live load carried by the car, so that the rate-coil RC is the more strongly excited during light-weight conditions, during the accelerating progression of the motors, thus controllably reducing the minimum-current setting at which the limit-relay CR picks up and opens its back-contact 58 (Fig. 1A) during the power-operation of the motors. This is a well-known, and practically necessary, expedient, the operating mechanism thereof being symbolically indicated by the letters WT.

In Fig. 1B, a second energizing-circuit is provided for the conductor 126 of the rate-coil RC. This second energizing-circuit extends back, to the left, from the power-off switching-circuit 47, which is energized only when the power-operation of the traction-motors A1 and A2 of Fig. 1A is deenergized, as indicated by the G1 interlock 46 in Fig. 1A. In Fig. 1B, therefore, a circuit is provided, which extends to the left, from the power-off switching-circuit 47, through a back-contact 127 of the ground-switch G1, to a braking-responsive rheostat BKG, and thence through an adjustable resistance R17 to the energizing-circuit 126 of the rate-coil RC. The resistance-adjusting contact-arm of the braking-responsive rheostat BKG is moved by the brake-actuator BA, in an amount which is dependent upon the amount of braking which is called for by the brake-valve BV (Fig. 1A), which controls the air-pressure in the straight-air pipe SA, to which the brake-actuator cylinder BA is connected, as shown in Fig. 1A. This braking-responsive rheostat BKG has its resistance automatically increased in response to the amount of brake-application called for by the brake-valve BV, so that the rate-coil RC has its maximum dynamic-braking excitation when a low braking-rate is called for, thus providing a low minimum-current setting at which the limit-relay CR picks up and opens its back-contact 58 (Fig. 1A) during the dynamic braking.

The next control-circuit in Fig. 1B shows how the brake-switch B1 is energized, in order to initiate dynamic braking. Thus, near the bottom of the power-off switching circuit 47, a leftwardly extending branch-circuit extends through an R2 back-contact 128 and a B4 back-contact 129 to a circuit 130, which is extended through the operating-coil B1 of the brake-switch B1 to a circuit 131, the negative connection of which is completed through a subsequently described back-contact 146 of the brake-switch B4. It will be observed that this braking-circuit is not normally established until the main master controller MC is moved to its off-position in Fig. 1A. This off-movement of the master controller first causes the opening of the ground-switch G1, and later the opening of the line-switches LS1 and LS2. The opening of the G1 switch opens the interlock 53, thereby deenergizing the holding-circuit 54-123 (Fig. 1B) of the two parallel connection-switches M and G, and also deenergizing the holding-circuit 54-110 (Fig. 1B) of the transition-switch J, and also deenergizing the energizing-circuit 54—55—56 (Fig. 1A) of the series-connection switch JR. Thus, whichever of these switches M, G, JR or J had been closed are opened, thus opening all of the resistance-switches R1 to R8, at either the JR interlock 100 (Fig. 1B) or the G interlock 105 (Fig. 1B). The opening of the resistance-switch R2 energizes the B1 switch, through the R2 interlock 128 (Fig. 1B). Meanwhile, the line-switch LS1 is open, and when it opens, it energizes the parallel-connection switches M and G, through the LS1 interlock 103 (Fig. 1B).

These operations result in the closure of the switches M, G and B1, thus establishing the dynamic-braking circuits, with all of the braking-resistance R14, and all of the accelerating resistances R11 and R12 in circuit, thus producing a very small braking-current, and a very small braking-force, which is normally negligibly small and which makes it feasible to establish a very weak dynamic-braking circuit in readiness for a "service" application of dynamic brake, as will be subsequently described. This weak operation of dynamic brake is called "spotting." During the spotting-operation, the spot-coil SC (Fig. 1A) of the limit-relay CR is energized, from the tapped portion 22-T2 of the dynamic-braking resistance R14, and the field-controller is caused to progress, in one direction or the other, under the control of the make and break contacts 59 and 58 (Fig. 1A) of the limit-relay CR, in order to "spot" the operating-conditions of the dynamic-braking circuit in accordance with the speed of the car, so that, if and when a "service" braking-operation is called for, the "service" dynamic-braking conditions may be entered into smoothly and without overshoot.

Returning, again, to Fig. 1B, it will be noted that the bottom of the power-off switching-circuit 47 has a leftwardly extending branch-circuit which extends through a B5 make-contact 132 and a B1 make-contact 133, to the energizing-circuit 130 of the B1 relay, thus establishing a hold-circuit therefor.

Next, in Fig. 1B, there is shown a circuit from the wire 65 of Fig. 1A, extending through a make-contact 134 of the brake-actuator BA, to energize the field-controller circuit C2, and hence the progress-wire C1 when the field-controller segment 32 is energized in the full-field position FF of the field-controller FC in Fig. 1A, as is more fully explained in the aforesaid Purifoy application.

The next control-circuit which is shown in Fig. 1B is a branch-circuit which extends from the progress-wire C1 through a B1 back-contact 135 and a B3 make-contact 136 to the energizing-circuit 130 of the B1 switch.

Next, in Fig. 1B, there is shown a branch-circuit from the progress-wire C1, through a B5 make-contact 137 to a conductor 138. A second energizing-circuit for this conductor 138 is shown as extending from the progress-wire C1 through a B1 make-contact 139 to this conductor 138. This B1-interlock 139 constitutes the first resistance-reducing progression-step of a service-application of dynamic brake, so that the conductor 138 is energized in joint response to a closure of the braking-switch B1, a full-field position of the field-controller FC, and a closure of the limit-relay back-contact 58 (Fig. 1A) in the braking-progression circuit 63—66—65. As shown in Fig 1B, the aforesaid conductor 138 is connected on, through a B2 back-contact 140, to a conductor 141, and thence to the B2 operating-coil, and to the previously mentioned circuit 131. A holding-circuit is immediately completed from the hold-line C4 through a B2 make-contact 142 to the conductor 141.

Fig. 1B next shows a branch-circuit from the progress-line C1 through a B3 back-contact 143 and a B2 make-contact 144 to a conductor 145, and thence through the B3 operating-coil to the previously mentioned circuit 131. This circuit 131 is connected to the negative bus (—) through two branch circuits, one including the B4 back-contact 146 and the other including a B5 make-contact 147. As soon as the B3 switch is actuated, it completes a hold-circuit from the hold-wire C4 through a B3 make-contact 148 to the circuit 145.

In Fig. 1B, the bottom of the progress-wire C1 is shown as being connected through a circuit which extends through a B5 back-contact 149 to a conductor 150. A connection is made from the conductor 150 through a B3 make-contact 151 and a conductor 152 to the B4 energizing-coil, and then to the negative bus (—). As soon as the B4 switch picks up, it energizes a holding-circuit from the hold-wire C4 through a B4 make-contact 153 to the aforesaid conductor 152.

The conductor 150, at the bottom of Fig. 1B, is also connected, through a branch-circuit which extends through a B2 back-contact 154, and a B4 make-contact 155, to a circuit 156, and thence through the B5 actuating-coil to the negative bus (—). As soon as the B5 switch closes, it closes a holding-circuit from the bottom of the hold-wire C4 in Fig. 1B through a B5 make-contact 157 to the conductor 156.

The operation of the illustrated circuit-connections, which have now been described, is shown in Fig. 2, which is a sequence chart which will suffice as a basis for explaining the novel features of our invention. The general plan of the sequence chart is well known to all who are familiar with the past practices of the art, in controlling both the power-operation and the dynamic-braking operation of traction-motors for electrically propelled railway-cars. As is customary in this sort of chart, a small circle indicates a closed position of a contact or an energized condition of a coil or circuit. We shall direct our explanations more particularly to the special features of our invention.

When the car is first being readied for operation, with the master controller MC in its off-position, and with no power on the supply-circuit 18 for the motors, as shown in step A of the sequence chart, the supply-line 18 will first be energized, thereby picking up the line-relay LR as shown in step B.

The train is then ready for a power-operation, in which the brake-valve BV is moved to its off-position, and the main drum of the master controller MC is moved either immediately to its No. 3 on-position, or in a step-by-step manner to successive on-positions 1, 2 and 3, resulting in the well-known power-operation steps which are exemplified by steps P1 to P7, a transition step TR, and steps P8 to P15 in Fig. 2.

When the motorman wishes to discontinue the power-operation, he returns the controller through positions 2 and 1 to the off-position, resulting in steps PA, PB, C', D', E', F' and 1 of the illustrative sequence chart, which has been prepared on the assumption that the cutting off of power followed a full-parallel, shunted-field, operating-step P15, although it will be understood, of course, that the master controller could be returned to its off-position from any other step of the power-operation of the motors.

As long as the master controller is in any on-position, such as 2 or 1, as indicated by the steps PA and PB in the sequence chart, none of the previously closed motor-operating switches or contacts are disturbed, because they are all held by suitable holding-circuits which have been described.

It will be noted that, when the controller is moved from its No. 1 on-position, as shown in step PB, to its off-position, the wire GS is first deenergized, as shown in step C' of the chart, and this deenergizes the coil of the ground-switch G1. When the ground-switch G1 opens, it deenergizes the main operating or closing-coils M and G of the two parallel-operation switches M and G through the G1 interlock 53, as shown in step D', causing these switches M and G to open. The opening of the switch G causes an opening of all of the resistance-switches R1 to R8, through the G interlock 105, as shown in step E' of the chart. The opening of the resistance-switch R2 causes an energization of the braking-circuit switch B1, through the interlock 128, as shown in step F', noting that the power-off switching-circuit 47 is now energized, through the G1 interlock 46.

Meanwhile, the master controller is continuing to move away from its No. 1 on-position toward its off-position, at some time before the off-position is fully reached, usually before the steps D' and E' of the sequence chart, but being shown, for convenience, as occurring after the step E', the wires 12' and 6 will both be deenergized at the master controller, thereby deenergizing the line-switches LS1 and LS2, as shown in step F'. When the line-switch LS1 is open, its interlock 103 will energize the two parallel-connection switches M and G, thereby completing a dynamic-braking circuit, in the spot-step 1, and also energizing the spot-coil SC, as shown in Fig. 2. During the continuance of the spotting condition of the dynamic-braking circuits, the limit-relay CR touches its back-contact 58 whenever the spotting-current is undesirably small, thereby notching the field-controller FC toward its full-field position FF, through the progression-circuit 63—66—65—C9. This operation is shown in steps 1, 2 and 3 of the sequence chart.

If, now, the motorman desires a "service" application of dynamic braking, he moves the brake-valve BV to an on-position, moving it little or much, according to the amount of braking which he desires. As shown in step 4 of the sequence chart, this on-movement of the brake-valve BV results directly in actuating the brake-actuator BA from its deenergized position to an energized position. As described in the aforesaid Purifoy application, the back-contact 27 of the brake-actuator BA thereupon opens and deenergizes the spot-coil SC, thus changing the current-setting of the limit-relay CR from a small value suitable for spotting, to a large value suitable for producing a serviceable amount of dynamic brake. At the same time, the brake-actuator BA opens its back-contact 61, thereby ensuring the deenergization of the shunt-field coil FC–SF of the field-controller, even though the limit-relay make-contact 59 might momentarily close, thus preparing the way for the progress-circuit 58—63—66—65—C9 to begin notching the field-controller FC toward its full-field position FF, as shown in step 4, and thereupon introducing the resistance-reducing part of the dynamic-braking progression, through the circuit 58—63—66—65—134—C2—32—C1, which is completed by the closure of the field-controller contact 32 and the brake-actuator contact 134.

During the remainder of the dynamic-braking operation, successive sequence-steps are taken, in a well-known manner, as shown at steps 4 to 15 of the sequence chart, each step being taken upon the subsidence of the braking-current to a value which is small enough to permit the limit-relay CR to close its back-contact 58.

When the last two braking-steps 14 and 15 are taken, the dynamic-braking operation has substantially reached its fade-out point, the braking effort being very small, and the car-speed being close to zero, perhaps something like three to five miles per hour. In step 15, the last resistance-switch R8 is closed, and its interlock 28 deenergizes the lock-out magnet LOM, thus opening the lock-out valve LOV and bringing the air-brake equipment into operation (or into stronger operation if it had been in limited operation), so as to bring the car to a complete standstill.

Our present invention relates to a control-assembly in which the motorman releases or discontinues a "service" dynamic-braking operation at a time prior to brake fade-out. The greatest trouble, due to burning of the arc-chutes of switches in the dynamic-braking circuits, has heretofore occurred at high car-speeds, that is, at one of the early or intermediate braking-steps in the range from 4 to 11 in Fig. 2. However, our invention is applicable to any brake-release which is made prior to step 14, which is practically indistinguishable from step 15, which is the fade-out step.

To illustrate this brake-releasing operation, we have added, after the braking-step 15 in the sequence chart of Fig. 2, a line which is a repetition of the No. 13 dynamic-braking step, although it is to be understood that we might have chosen any of the steps 4 to 13 for our illustrative example. In the next line of the sequence chart, Fig. 2, we have shown a step *, which represents a condition in which the brake-valve BV has been returned to its off-position, thus deenergizing the brake-actuator BA, as shown in said step *. The deenergization of the brake-actuator BA closes its back-contact 27, thus energizing the spot-coil SC, which is necessary as a preliminary to establishing "spotting" conditions. The energization of the spot-coil SC reduces the setting of the limit-relay CR, so that this relay immediately closes its make-contact 59, thereby completing a positive circuit 45—46—47—50—49—59—60, which contains a now-closed back-contact 61 of the brake-actuator BA. This circuit continues in a circuit 61—62—C8—35—C7, which energizes the shunt-field magnet-coil FC–SF, which causes the field-controller FC to move, without pausing, from its full-field position FF, to a position which is intermediate between its positions F3 and SF, or to a point which is usually just short of its last shunted-field position SF. Thus, in Fig. 2, a shunted-field step *A follows quickly after the step * in which the braking-operation was first released or discontinued.

In the operation just described, it will be noted that, before the field-controller segment 35 rode off of the field-controller terminal-contacts C7 and C8, so as to deenergize the shunt-field magnet-coil FC–SF, another field-controller segment 33 rode off of its field-controller terminal-contacts C3 and C4, thus deenergizing the hold-circuit C4 after the motor-fields had been shunted, in the F3 position of the field-controller FC. The hold-circuit C4 is the circuit which maintains a closed position for all of the braking-switches except B1, and for all of the accelerating-resistance switches except R7 and R8. It will be noted, therefore, that an opening of the holding-circuit at the field-controller segment 33 results in an opening of the braking-switches B2 to B5 and an opening of the resistance-shorting switches R1 and R2, thereby producing a spotting-step *B in Fig. 2; but this does not occur until the shunted-field condition of the motors A1 and A2 has reduced both the motor-voltage and the motor-current, thereby overcoming switch-burning on a brake-release, which was the object of our present invention. Our control has the further advantage of reducing the suddenness of a brake-release, by first reducing the magnitude of the dynamic-braking effort, thus enhancing the comfort of the passengers. When the spotting condition is reached, as shown in step *B, the equipment stands in readiness for either another "service" braking-operation or another power-operation of the traction motors.

When the braking-switch B5 opens, in step *B, its interlock 23 deenergizes the hold-coils M-Hold and G-Hold of the two parallel-connection switches M and G, but these switches do not open, because the deenergized condition of the resistance-switch R7 keeps its back-contact 114 closed, so as to maintain the energization of the main closing-coils M and G of these two switches M and G, thus maintaining the integrity of the "spotting" braking-circuits, which require the closure of the three switches M, G and B1.

The last nine lines of the sequence chart, Fig. 2, have been added to show that, if the motorman should release, or turn off, the brake-valve BV when the dynamic-braking progression has proceeded substantially to fade-out, as in the braking-step 14, for example (the off-position of the brake-valve BV and the deenergized condition of the brake-actuator BA being shown in step ⊕), then steps ⊕A and ⊕B will follow, as described for steps *A and *B, except that now, because the resistance-switch R7 is energized, the R7 back-contact 114 will be open, thus deenergizing the operating or closing-coils M and G of the parallel-connection switches M and G. Thus, when the M and G holding-coils M-Hold and G-Hold are deenergized at the B5 interlock 23, as shown in step ⊕B, these parallel-connection switches M and G will open, in addition to the switches R1, R2, and B2 to B5, so that the braking-circuits will be altogether opened, at the main switch-contacts M and G, so that the step ⊕B is not a spotting-step, but a step in which the dynamic-braking circuit has been lost completely, thus making it impossible to obtain another "service" application of dynamic braking, until there has been another power-operation of the motors A1 and A2.

When the braking-circuit is completely deenergized, in step ⊕B of the sequence chart, the limit-relay CR closes its back-contact 58 in the positive circuit 45—46—47—50—49—58, and completes an energizing-circuit 58—63—66—65—C9 for the full-field magnet-coil FC–FF, causing the field-controller FC to move to its full-field position FF, opening all of its field-shunting contacts C10 to C17, as shown in step ⊕B in the sequence chart.

If, after the step ⊕B in the sequence chart, Fig. 2, it is desired to again establish a power-operation of the motors, the motorman moves the master controller MC to any on-position, such as the No. 1 position which is shown in the transition-step TR1 of the sequence chart. The first movement of the controller energizes the wires 12' and 6, as shown in the step TR1, but no switching-changes are made in the motor-circuits, because of the open B1 interlock 38 in the energizing circuit for the line-switch LS1. Immediately thereafter, as the master controller MC moves just a little further, the wire GS is energized, thus energizing the ground-switch G1, as shown in step TR2 of the chart. When the ground-switch G1 picks up, it deenergizes the resistance-switch R7 and the braking-switch B1, because of the opening of the G1 interlocks 46 and 50, thus interrupting the remaining braking-circuit connections, as shown in the step TR3 of the chart. The deenergization of the B1 switch energizes the line-switch LS1, through the B1 interlock 38, resulting in the circuit-condition shown in step TR4. The energization of the line-switch LS1 energizes the series-connection switch JR through the LS1 interlock 51, thus establishing a repetition of the first power-operation step P1, as shown in the last line of the sequence chart.

It will be understood that, in all such complicated control-circuit arrangements, such as are necessary for controlling the acceleration and the dynamic-braking of an electrically propelled car, there are a great many alternative and substantially equivalent circuit-expedients, which can be used, and which from time to time are used, for accomplishing essentially the same results by essential equivalents of the same circuit-means or expedients. While, therefore, we have illustrated our invention in but a single exemplary arrangement, and while we have greatly simplified this illustration by omitting many known features, some of which would be practically necessary in any competitively acceptable control-system, we wish it to be clearly understood that we are not altogether limited to the precise details of every illustrated connection; and that the broader aspects of our invention contemplate the possibility of the substitution of equivalents for one or more of the circuit-elements, the addition of other circuit-elements which have not been shown in our simplified drawings, and the omission of details or elements which may not be needed in some installations.

We claim as our invention:

1. A control system for a plurality of direct current series motors, each motor having an armature and a series field winding, said system including means for establishing power circuits for operation of said motor, means for establishing a dynamic braking circuit for said motors, said power and braking circuits including resistors, shunting switches for progressively shunting said resistors in a predetermined sequence, field shunting means for progressively shunting said field windings, means operative upon interruption of said power circuits to effect establishment of said braking circuit with all of said shunting switches in open position and to effect operation of said field shunting means to a position where the fields are not shunted, said resistors limiting the current in the braking circuit so that no effective braking action is obtained, braking control means for controlling application and release of dynamic braking, means responsive to actuation of the braking control means to brake-applying position to initiate progressive operation of the shunting switches to control the current in the braking circuit for effective dynamic braking, and means responsive to actuation of the braking control means to brake-releasing position to effect operation of the field shunting means to at least partially shunt the field windings and to thereafter effect operation of the shunting switches to open position.

2. A control system for a plurality of direct current series motors, each motor having an armature and a series field winding, said system including means for establishing power circuits for operation of said motors, means for establishing a dynamic braking circuit for said motors, said power and braking circuits including resistors, shunting switches for progressively shunting said resistors in a predetermined sequence, field shunting means for progressively shunting said field windings, means operative upon interruption of said power circuits to effect establishment of said braking circuit with all of said shunting switches in open position and to effect operation of said field shunting means to a position where the fields are not shunted, said resistors limiting the current in the braking circuit so that no effective braking action is obtained, braking control means for controlling application and release of dynamic braking, means responsive to actuation of the braking control means to brake-applying position to initiate progressive operation of the shunting switches to control the current in the braking circuit for effective dynamic braking, and means responsive to actuation of the braking control means to brake-releasing position to effect operation of the field shunting means to a position where the field windings are at least partially shunted, and means operative when the field shunting means is in the last-mentioned position to effect operation of the shunting switches to open position.

3. A control system for a plurality of direct current series motors, each motor having an armature and a series field winding, said system including means for establishing power circuits for operation of said motors, means for establishing a dynamic braking circuit for said motors, said power and braking circuits including resistors, shunting switches for progressively shunting said resistors in a predetermined sequence, field shunting means for progressively shunting said field windings, means operative upon interruption of said power circuits to effect establishment of said braking circuit with all of said shunting switches in open position and to effect operation of said field shunting means to a position where the fields are not shunted, said resistors limiting the current in the braking circuit so that no effective braking action is obtained, braking control means including a brake actuating device having brake-applying and brake-releasing positions, means responsive to actuation of the brake actuating device to brake-applying position to initiate progressive operation of the shunting switches to control the current in the braking circuit for effective dynamic braking, means responsive to actuation of the brake actuating device to brake-releasing position to effect operation of the field shunting means to a position where the field windings are at least partially shunted, and means to effect operation of the shunting switches to open position after the field shunting means has reached its last-mentioned position.

4. A control system for a plurality of direct current series motors, each motor having an armature and a series field winding, said system including means for establishing power circuits for operation of said motors, means for establishing a dynamic braking circuit for said motors, said power and braking circuits including resistors, shunting switches for progressively shunting said resistors in a predetermined sequence, field shunting means for progressively shunting said field windings, means operative upon interruption of said power circuits to effect establishment of said braking circuit with all of said shunting switches in open position and to effect operation of said field shunting means to a position where the fields are not shunted, said resistors limiting the current in the braking circuit so that no effective braking action is obtained, braking control means including a brake actuating device having brake-applying and brake-releasing positions, means responsive to actuation of the brake actuating device to brake-applying position to initiate progressive operation of the shunting switches to control the current in the braking circuit for effective dynamic braking, means responsive to actuation of the brake actuating device to brake-releasing position to effect operation of the field shunting means to a position where the field windings are at least partially shunted, said field shunting means including contact means for controlling the shunting switches, and said contact means being operative to effect operation of the shunting switches to open position in response to operation of the field shunting means to its last-mentioned position.

References Cited in the file of this patent
UNITED STATES PATENTS

| | | |
|---|---|---|
| 2,669,685 | Lichtenfels | Feb. 16, 1954 |
| 2,693,562 | Purifoy et al. | Nov. 2, 1954 |